United States Patent [19]

Barr

[11] Patent Number: 4,509,624
[45] Date of Patent: Apr. 9, 1985

[54] PARKING BRAKE SAFETY MECHANISM FOR AUTOMATIC TRANSMISSIONS

[76] Inventor: William A. Barr, Gibson Island, Md. 21056

[21] Appl. No.: 631,793

[22] Filed: Jul. 17, 1984

Related U.S. Application Data

[63] Continuation of Ser. No. 363,080, Mar. 29, 1982.

[51] Int. Cl.³ .............................................. B60K 41/26
[52] U.S. Cl. .................................................... 192/4 A
[58] Field of Search ............ 192/4 A, 4 R; 180/82 A, 180/77 R; 188/31, 69; 74/475, 477

[56] References Cited

U.S. PATENT DOCUMENTS

| | | | |
|---|---|---|---|
| 3,601,231 | 8/1971 | Kolacz | 192/4 A |
| 3,703,941 | 11/1972 | Ohie | 192/4 A |
| 4,413,712 | 11/1983 | Richard | 192/4 A |

Primary Examiner—George H. Krizmanich
Attorney, Agent, or Firm—Scivener Clarke Scrivener and Johnson

[57] ABSTRACT

A parking brake for automatic transmissions increases the safety of such brakes by arranging the cam, control rod, pawl and lost motion spring so that whenever the shift lever is not moved to its full park position with the engine running, the lost motion spring exerts a force on the mechanism blocking return thereof to reverse position while urging the mechanism in the direction of its park position, thereby preventing the vehicle thought to have been parked from suddenly moving in reverse possibly injuring anyone standing behind the vehicle.

15 Claims, 4 Drawing Figures

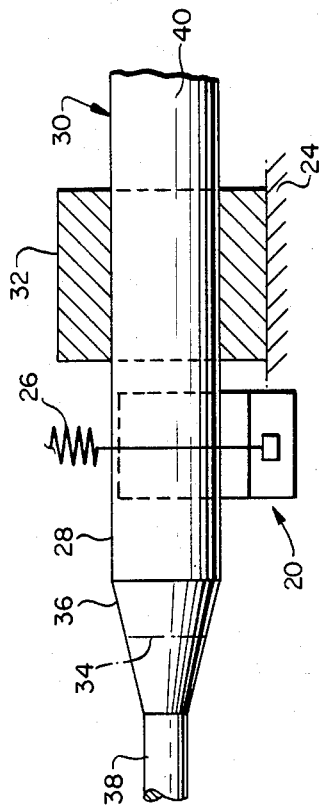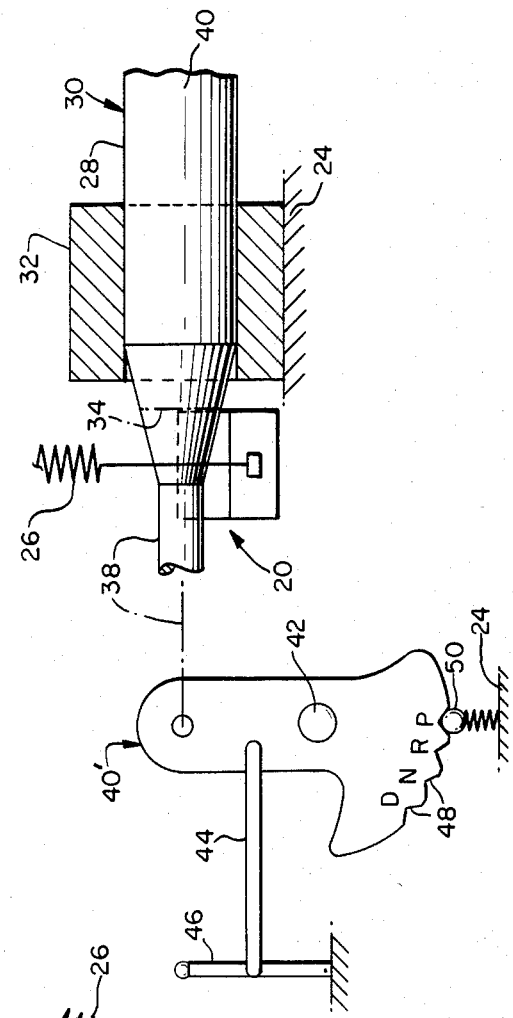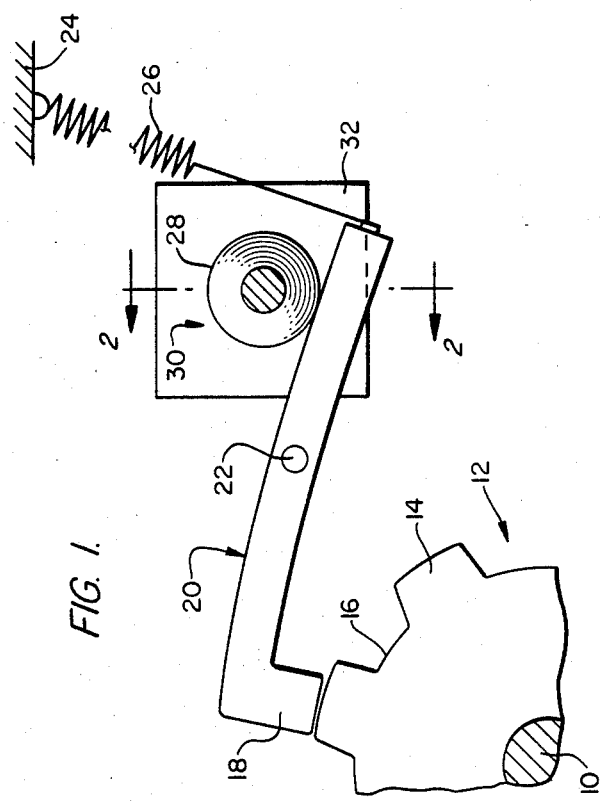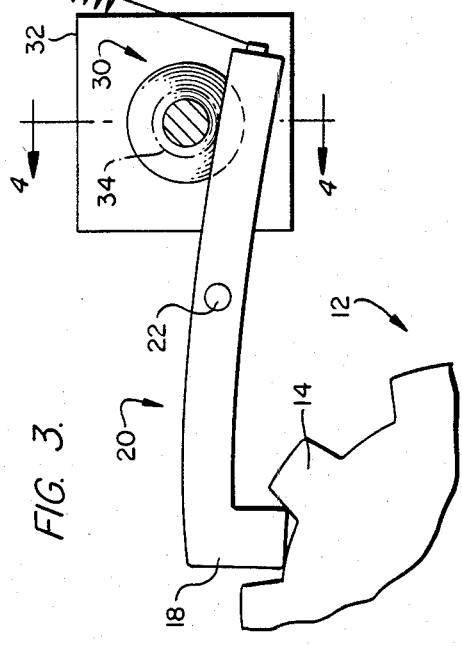

PARKING BRAKE SAFETY MECHANISM FOR AUTOMATIC TRANSMISSIONS

This application is a continuation of application Ser. No. 363,080, filed Mar. 29, 1982.

This invention relates to parking brake mechanism and more particularly to means for increasing the safety of a parking brake mechanism for vehicle automatic transmissions.

Automatic transmissions for vehicles are controlled by a driver operated shift lever which is movable in one direction from a neutral position into one or more drive positions and in an opposite direction from neutral, first, to a reverse position and then to a park position. In every position of the shift lever except park, valve means in the automatic transmission are operated to control the transmission. In the park position the transmission is, of course, placed in a non-drive state and at the same time the shift lever operates a control rod carrying a cam which reacts against a pawl to urge it in the direction of a toothed wheel connected to the transmission out-put shaft. Because the spaces between the teeth of the wheel are not always aligned with the pawl, the pawl may land on the radial outer surface of a tooth and there must be lost motion mechanism including resilient means which enables the shift lever to be moved into its park position while the pawl is still not yet in its park position, the resilient means exerting a force on the pawl to move it into an inter-tooth space on the parking gear as soon as the vehicle has moved a slight distance sufficient to align a space with the pawl.

The above arrangement is satisfactory so long as the driver makes certain that the shift lever is positioned completely in its park position. Occasionally, a driver is careless and the shift lever is accidently positioned intermediate its park and reverse positions. Under these circumstances, should the pawl hang up on a tooth surface, as the pawl must do about 50% of the time, and should the engine be still running, the resilient means of the lost motion connection can exert a force on the control rod in a direction away from "park" and drive the driver controlled lever back to its "reverse" position causing the car to suddenly and unexpectedly move in reverse. Should someone be behind the car he may and has been badly injured.

The broad object of this invention is to substantially eliminate the above described problem.

More particularly, it is an object of the invention to eliminate the problem by so arranging the pawl, cam and lost motion spring that in the event the shift lever is accidently moved only partially towards "park" position, the force exerted by the spring on the control rod always blocks its return to "reverse" while urging it in the direction of "park" rather than urging it in the direction of "reverse," as is now almost universally the practice.

The foregoing and other objects will become apparent as the following detailed description is read in conjunction with the accompanying drawings wherein:

FIG. 1 is a schematic diagram of a parking brake for use with an automatic transmission and incorporating the present invention;

FIG. 2 is a view taken substantially along the line 2—2 of FIG. 1;

FIG. 3 is a view similar to FIG. 1 but showing the parts in change position; and FIG. 4 is a view taken substantially along the line 4—4 of FIG. 3 and showing schematically additional components of the gear shift mechanism.

Referring now to the drawings the numeral 10 designates the output shaft of an automatic transmission having connected thereto, as by splines (not shown), a toothed parking gear 12 having teeth 14 defining spaces 16 therebetween adapted to receive the tooth 18 at one end of a parking pawl 20 which is pivoted at 22 to a relatively fixed part of the transmission housing 24. The pawl tooth 18 is urged at all times in the direction of the parking gear 12 by resilient means which may be the coil tension spring 26 shown which reacts between the end of the pawl remote from the tooth and the transmission housing 24.

In FIGS. 1 and 2, the pawl end to which the spring 26 is attached is urged by the spring into engagement with a first surface 28 of an axially movable cam member 30 which is slideably guided in a guide block 32 fixed to the transmission housing 24 adjacent the pawl 20. Whenever the pawl is engaged with the surface 28 the pawl tooth 18 is retained in a non-braking position clear of the pawl teeth 14. The cam 30 has a second surface 34 spaced a greater distance from the pawl than the first surface 28 to enable the spring 26 to move the pawl tooth, when aligned with the space 16 between teeth 14 of the parking gear 12, into its braking position. As is clear in FIG. 2, the surfaces 34 and 28 are joined by a sloping cam surface 36 and preferably the arrangement is as shown whereby the sloping surface 36 is defined by a cone connected at its smaller end to a control rod 38 and at its larger end merges into an elongated cylindrical part 40 whose outer surface defines the above described first surface 28 of the cam.

With reference now to FIG. 4 it will be observed that the end of the control rod 38 remote from the cam member 30 is pivotally connected to a conventional detent plate 40' rotatably mounted at 42 to a fixed part of the transmission housing. Connected to the detent plate intermediate the control rod 38 and pivot 42 is one end of a link 44 whose opposite end is connected to a driver controlled shift lever 46 which is movable in a slotted member (not shown) having lever positions marked thereon corresponding to "neutral" and one or more "drive" positions when the lever is moved in one direction from "neutral" and "reverse" and "park" positions when the lever 46 is moved in the opposite direction from neutral. The lower edge of the detent plate is provided with notches 48, marked "D", "N", "R" and "P" in the drawing and corresponding to the first drive, neutral, reverse and park positions, respectively, of the shift lever 46. A spring loaded detent 50 engages with the respective notches when the plate 40' is rocked by the lever 46 to the selected position appearing on the slotted plate.

In operation, with the driver controlled shift lever in any non-park position, the pawl is urged by the spring 26 against the surface 28 of the cylindrical part 40 which, it will be observed, has sufficient axial length that for every possible position of the shift lever and detent plate, except "park", the pawl engages the surface 28 and is thereby retained in its non-park position of FIG. 1.

When the shift lever and detent plate are moved to "park," the conical surface 36 of the cam member is slid beneath the pawl until the region 34 is reached whereby the pawl tooth 18 may be moved by the spring 26 into an intertooth space 16 on the parking gear if the tooth is in alignment with a space. Should the pawl tooth not be in alignment with a space 16 it engages the outer radial surface of a tooth substantially as shown in FIG. 1 and the pawl is retained by the tooth surface out of engagement with the cam surface 34 until the vehicle rolls a slight distance sufficient to bring an inter-tooth space 16 into registration with the pawl tooth and lock the parking gear.

Assume now that the driver accidently fails to move the shift lever fully into the park position so that the pawl engages the conical surface 36 somewhere between the surfaces 34 and 28. Under these circumstances, the reverse valve will have been operated so that the vehicle is not, at this time, driven in a reverse direction yet the pawl may not be able to move enough towards the parking gear to ensure that the output shaft is locked against movement. The force of the spring 26, however, acting on the pawl, causes it to re-act against the sloping cam surface 36 and positively prevent the cam and hence the control rod and detent plate from moving in the direction of "reverse", thus preventing dangerous unexpected reverse movement of the vehicle. By selecting the cone slope pitch so that frictional resistance does not exceed the force of the spring loaded pawl on the sloping surface, it is entirely possible to design the arrangement that the cam is actually moved by the pawl into its full "park" position as soon as an inter-tooth space 16 aligns with the pawl tooth. Even if this does not take place, any possibility of the cam being driven back into its reverse position through the action of a yielding lost-motion spring is eliminated due to the fact that there is substantially no force acting in that direction while there is a preponderant force acting in the opposite direction, if not strong enough to bodily move the mechanism to "park" at least to block positively any tendency to move towards "reverse".

Many of the prior art arrangements, while possessing the safety problems explained above, require the use of both a pawl spring, usually urging the pawl away from the parking gear, and a separate lost motion spring, as illustrated, for example, in U.S. Pat. No. 3,601,230. In the present invention, the pawl spring itself also serves as the lost motion spring thereby decreasing cost and complexity. It will be apparent, of course, that the tension spring 26 shown is merely representative since any type of resilient means such as a torsion spring, or a compression spring on the appropriate sides of the pivot and pawl would serve equally well.

It should be noted that it is desirable that the surface 34 be on the sloping part of the cone, or its equivalent, to ensure that when the shift lever is accidently not moved into its full park position, the spring loaded pawl will always bear on the sloping part of the cam to urge it in the direction of its park position. Should the pawl align only with the end of control rod 38 under such circumstances, though the pawl might block the return of the mechanism to its reverse position, the cam would not be urged by the spring loaded pawl towards its park position. This explains why the surface 34 is shown on the conical surface itself.

Applicant has specifically described an arrangement using axially movable control rod and cam means. The invention is by no means restricted to such an arrangement but applies equally to systems utilizing rotary control rods and cams as shown, for example, in U.S. Pat. No. 3,703,941. Thus, the invention is susceptible of a wide variety of changes and modification without, however, departing from the scope and spirit of the appended claims.

What is claimed is:

1. A parking brake for an automatic transmission comprising a toothed parking gear secured to an output shaft journaled in a stationary housing of a vehicle, a pawl movable in between a park position in which said pawl engages said gear and non-park position in which it is clear of said gear, driver operated means movable in opposite directions between park and reverse positions, a control rod connected to said driver operated means, cam means operated by said control rod and engageable with said pawl to effect movement thereof towards said parking gear when said driver operated means is moved to its park position and to effect movement of said pawl clear of said gear when said driver operated means is moved to its reverse position, lost motion means between said driver operated means and said pawl enabling said driver operated means to be moved to its park position when said pawl engages the surface of a tooth of said parking gear intermediate spaces on either side of said tooth, and resilient means arranged to re-act against said control rod when the driver operated means in cooperation with said lost motion means is accidently positioned intermediate its park and reverse positions, to exert a force on said driver operated means which at all times while the latter is in said intermediate position restrains movement thereof from said intermediate position towards its reverse position while tending to move said driver operated means in a direction away from its reverse position and towards its park position.

2. The parking brake of claim 1 wherein said resilient means exerts a force on said driver operated means through said pawl, said resilient means acting at all times on said pawl to urge it towards its park position, said cam means being arranged to engage said pawl to move it towards its non-park position against the opposition of said resilient means.

3. The parking brake of claim 2 wherein said cam means comprises an axially movable body connected at one end to said control rod and having a first surface engageable by said pawl to move it to its non-park position, a second surface spaced a greater distance from said pawl than said first surface to enable said resilient means to move said pawl to its park position when said pawl is aligned with said second surface, and a sloping cam surface joining said first and second surfaces, said first surface being at the end of said body remote from the one end thereof connected to said control rod.

4. The parking brake of claim 3 wherein said first surface has an axial extent which retains said pawl in its non-park position for every position other than park of said driver operated means.

5. The parking brake of claim 2 including a fixed guide adjacent said pawl slidably and axially receiving the body of said cam means.

6. The parking brake of claim 1 wherein said cam means is moved axially in response to movement of said control rod.

7. The parking brake of claim 2 wherein said resilient means is a spring which re-acts between said pawl and a fixed part of said vehicle.

8. The parking brake of claim 1 wherein said resilient means re-acts between said pawl and a fixed part of the vehicle and said cam means includes a cam surface sloping in a direction that when said resilient means urges said pawl into engagement with said cam surface force is exerted on the cam surface tending to move said cam means, said control rod and consequently said driver operated means from its reverse to its park position.

9. The parking brake of claim 4 wherein said first surface is defined by the outer surface of a cylindrical portion of the cam means and the second surface is defined by the sloping surface of a conical portion whose smaller end is connected to said control rod and whose larger end merges with said cylindrical portion.

10. A parking brake for an automatic transmission comprising a toothed parking gear secured to an output shaft journaled in a stationary housing of a vehicle, a pawl movable in the housing between a park position in which said pawl engages said gear and a non-park position in which it is clear of said gear, driver operated means including a control rod movable in opposite directions between park and reverse positions, cam means operated by said control rod and engageable with said pawl to effect movement thereof towards said parking gear when said driver operated means is moved in the direction of its park position and to effect movement of said pawl away from said gear when said driver operated means is moved to its reverse position, lost motion means between said driver operated means and said pawl and including yieldable resilient means enabling said driver operated means to be moved to its park position when said pawl engages the surface of a tooth of said parking gear intermediate spaces on either side of said tooth, said resilient means being arranged to re-act against said cam means and said pawl when said driver operated means is accidently positioned intermediate its park and reverse positions, to exert a force on said driver operated means tending at all times while the latter is in said intermediate position to move it in a direction away from said intermediate position and towards said park position.

11. A parking brake for an automatic transmission comprising a toothed parking gear secured to an output shaft journaled in a stationary housing of a vehicle, a pawl movable in the housing between a park position in which said pawl engages said gear and a non-park position in which it is clear of said gear, driver operated means including a control rod movable in opposite directions between park and reverse positions, cam means operated by said control rod and engageable with said pawl to effect movement thereof towards said parking gear when said driver operated means is moved towards its park position and to effect movement of said pawl away from said gear when said driver operated means is moved towards its reverse position, lost motion means between said driver operated means and said pawl enabling said driver operated means to be moved to its park position when said pawl engages the surface of a tooth of said parking gear intermediate spaces on either side of said tooth, and resilient means arranged to re-act against said control rod when said driver operated means is accidently positioned between its park and reverse positions to exert a force on said driver operated means tending at all times to move it in a direction away from its reverse position and towards its park position.

12. A parking brake for an automatic transmission comprising a toothed parking gear secured to an output shaft journaled in a stationary housing of a vehicle, a pawl movable in the housing between a park position in which said pawl engages said gear and a non-park position in which it is clear of said gear, driver operated means including a control rod movable in opposite directions between park and reverse positions, cam means operated by said control rod and engageable with said pawl to effect movement thereof towards said parking gear when said driver operated means is moved in the direction of its park position and to effect movement of said pawl away from said gear when said driver operated means is moved to its reverse position, lost motion means between said driver operated means and said pawl and including yieldable resilient means enabling said driver operated means to be moved to its park position when said pawl engages the surface of a tooth of said parking gear intermediate spaces on either side of said tooth, said resilient means being arranged to re-act against said cam means and said pawl when said driver operated means is accidently positioned intermediate its park and reverse positions, to prevent at all times while said driver operated means is in said intermediate position unintended movement, of said driver operated means in a direction away from said intermediate position and towards said reverse position.

13. The parking brake of claim 12, wherein said resilient means is also arranged to exert a force on said driver operated means tending to move it in a direction away from said intermediate position towards said park position.

14. A parking brake for an automatic transmission, said brake comprising a toothed parking gear secured to an output shaft journaled in a stationary housing of a vehicle, a pawl movable in the housing between a park position in which said pawl means engages said gear and a non-park position in which it is clear of said gear, driver operated means including a control rod movable in opposite directions between park and reverse positions, cam means operated by said control rod and engageable with said pawl to effect movement thereof towards said parking gear when said driver operated means is moved to its park position and to effect movement of said pawl clear of said gear when said driver operated means is moved to its reverse position, lost motion means including resilient means between said driver operated means and said pawl enabling said driver operated means to be moved to its park position when said pawl engages the surface of a tooth of said parking gear intermediate spaces on either side of said tooth, said resilient means being arranged to re-act against said driver operated means when the latter in cooperation with said lost motion means is accidently positioned intermediate its park and reverse positions, to exert a force on said driver operated means which at all times while the latter is in said intermediate position restrains movement thereof from said intermediate position towards its reverse position while tending to move said driver operated means in a direction away from its reverse position and towards its park position.

15. A parking brake for an automatic transmission comprising a toothed parking gear secured to an output shaft journaled in a stationary housing of a vehicle, a pawl movable in the housing between a park position in which said pawl engages said gear and a non-park position in which it is clear of said gear, driver operated means including a control rod movable in opposite directions between park and reverse positions, cam means operated by said control rod and engageable with said pawl to effect movement thereof towards said parking gear when said driver operated means is moved towards its park position and to effect movement of said pawl away from said gear when said driver operated means is moved towards its reverse position, lost motion means between said driver operated means and said pawl enabling said driver operated means to be moved to its park position when said pawl engages the surface of a tooth of said parking gear intermediate spaces on either side of said tooth, and resilient means arranged to re-act against said control rods when said driver operated means is accidently positioned between its park and reverse positions to exert a force on said driver operated means tending at all times to move it in a direction away from its reverse position and towards its park position.

* * * * *